United States Patent [19]
Welmer

[11] Patent Number: 5,574,965
[45] Date of Patent: Nov. 12, 1996

[54] LOCAL COMMUNICATION BUS SYSTEM AND APPARATUSES FOR USE IN SUCH A SYSTEM

[75] Inventor: Harm J. Welmer, Sutton, United Kingdom

[73] Assignee: D2B Systems Company Limited, Redhill, England

[21] Appl. No.: 958,039

[22] Filed: Oct. 5, 1992

[30] Foreign Application Priority Data

Oct. 4, 1991 [GB] United Kingdom .................. 9121203

[51] Int. Cl.$^6$ .................................................. H04H 1/00
[52] U.S. Cl. ............................... 455/3.2; 348/5; 455/4.2; 455/6.3
[58] Field of Search ............................... 358/84, 86, 335; 455/2, 4.1, 5.1, 5.2, 6.1, 6.2, 6.3, 353, 186.1, 186.2, 151.2, 151.1, 152.1, 151.4, 68–70, 352; 348/5, 12

[56] References Cited

U.S. PATENT DOCUMENTS

| | | | |
|---|---|---|---|
| 4,450,477 | 5/1984 | Lovett | 358/86 |
| 4,527,204 | 7/1985 | Kozakai et al. | 455/151.2 |
| 4,648,122 | 3/1987 | Hasegawa et al. | 358/86 |
| 4,760,442 | 7/1992 | O'Connel et al. | 455/5.1 |
| 4,787,085 | 11/1988 | Suto | 358/86 |
| 4,885,775 | 12/1989 | Lucas | 455/2 |
| 4,908,713 | 3/1990 | Levine | 358/335 |
| 4,926,497 | 5/1990 | Shirley, Jr. et al. | 455/67.1 |
| 4,935,924 | 6/1990 | Baxter | 358/86 |
| 5,003,619 | 3/1991 | Morris et al. | 455/69 |
| 5,081,534 | 1/1992 | Geiger et al. | 455/353 |
| 5,123,046 | 6/1992 | Levine | 455/151.2 |
| 5,136,411 | 8/1992 | Paik et al. | 358/86 |
| 5,179,439 | 1/1993 | Hashimoto | 358/86 |
| 5,297,204 | 3/1994 | Levine | 455/151.2 |

FOREIGN PATENT DOCUMENTS

| | | | |
|---|---|---|---|
| 0505006 | 3/1992 | European Pat. Off. | H04B 1/20 |
| 2223114 | 9/1988 | United Kingdom . | |

OTHER PUBLICATIONS

European Committee for Electrotechnical Standardization, CLC/TC 106 (Norway), "The Open Smart Card Interface For MAC Receivers".

"Specification of the interface between a Conditional Access Sub–System implemented as an integrated circuit card and a MAC–receiver", Issue 1, Jul. 1990.

*Primary Examiner*—Reinhard J. Eisenzopf
*Assistant Examiner*—Nguyen Vo
*Attorney, Agent, or Firm*—David L. Schreiber

[57] ABSTRACT

A number of domestic audio/video apparatuses (10,12,14) are interconnected by a Domestic Digital Bus (16) for the exchange of control information. A User I/O subdevice (41) in one apparatus is addressable by a control subdevice (22) of another apparatus to allow the display of menu items defined by the control subdevice. The User I/O subdevice returns user control signals by reference to the defined menu items. The right of menu control can be transferred via the User I/O subdevice to and from other control subdevices (20 etc.) to allow integration of the menu control functions of the different apparatuses.

7 Claims, 2 Drawing Sheets

LOCAL COMMUNICATION BUS SYSTEM AND APPARATUSES FOR USE IN SUCH A SYSTEM

BACKGROUND OF THE INVENTION

The invention relates to a local communication bus system comprising first and second apparatuses connected for the exchange of messages to a serial data channel, and to apparatuses for use in such a system. The invention relates in particular, but not exclusively, to a system of domestic audio and video apparatuses interconnected by a serial data channel bus for the exchange of control messages.

A known serial data channel of this type is provided by the Domestic Digital Bus (D2B), standardised by the International Electotechnical Commission (IEC), Geneva. The name D2B is a trademark of Philips Electronics NV. Examples of apparatuses including D2B interfaces are Philips' model 2070 television receiver and model VR6590 video cassette recorder (VCR) previously available in Europe. Such a data channel has many applications, and it is desired that a standardised set of 'application protocols' be developed, in addition to the basic communication protocols defined by the IEC, and that these protocols should be adhered to by many manufacturers of consumer apparatus. In particular, the use of such protocols can bring enhanced functionality and ease of use to the great variety of consumer electronic apparatuses available today and in the future, with true inter-brand compatibility.

The known apparatuses, for example, provide for integrated on-screen display facilities, so that a user controlling the VCR can receive information about the progress of VCR operations via the television screen. Such a feature is described in more detail in our copending European patent application EP-0 505 006-A2 (PHQ91010), not published at the priority date of the present application. There is a desire to integrate further the operation of the apparatuses of the system, for example to allow the user to have dialogue with an apparatus which itself has inadequate user input/output facilities. One example would be to provide menu driven control of an apparatus which itself has no means for displaying a menu, and/or no means for relating a displayed menu to input received from the user. While this is clearly possible in theory, there is an overriding cost requirement to minimise the amount of information that one apparatus must 'know' about the other apparatuses of the system. Furthermore, it is desirable for the user dialogue functions to integrate all apparatuses of the system, rather than being restricted to the control of only one apparatus in a given session.

A prior system for remote menu display has been proposed in the "Specification of the interface between a Conditional Access Sub-System implemented as an integrated circuit card and a MAC-receiver", released by Norwegian Telecom in July 1990. While this proposal allows the IC card ("Smart card") to display a menu and receive a user selection, this depends strictly on the availability of specific marked keys on the receiver handset. The smart card is furthermore required to receive information of all user control signals (for example "volume up"), whether or not they relate to its own user dialogue. There is also no facility to integrate the user interface of many apertures of the system.

Software interfaces for user dialogue within a single computer-controlled apparatus are also known, for example in the Apple Macintosh Computer, and the Gem User Interface Toolkit for Atari computers.

SUMMARY OF THE INVENTION

It is an object of the invention to enable the provision of improved user dialogue features in a system of interconnected apparatuses.

The invention provides a local communication system comprising first and second apparatuses connected for the exchange of messages to a serial data channel. The first apparatus of the system comprises a first control means, and the second apparatus comprises a user interface.

The first control means comprises:

a first initiating means for initiating a user dialogue session between the first apparatus and the second apparatus;

a first sending means for sending to the second apparatus a user information item for presentation to a user of the system during the user dialogue;

a first receiving means for receiving from the second apparatus, information which conveys user control signals in response to the user information item; and a second control means for controlling at least part of the system in accordance with said information.

The user interface means of the second apparatus comprises:

second receiving means for receiving the information item from the first apparatus and presenting it to the user;

third receiving means for receiving a control signal from the user during the user dialogue session;

identifying means for identifying an association between the user control signal and the user information item; and second sending means for sending to the first apparatus, information which conveys the control signal by reference to the user information item.

The system also includes a third apparatus which comprises a further control means. The first control means of the first apparatus further includes second initiating means for initiating a transfer of control of the session to the third apparatus during the user dialogue session, and the further control means of the third apparatus includes fourth receiving means for receiving transferred control of the user dialogue session, such that said further control means will continue the transferred session without active participation by said first control means.

By providing a transfer of control of the user dialogue session between apparatuses, the system allows integration of user dialogue functions over the system as a whole. If the manner of establishing the user dialogue session is standardised, this holds true even though the different apparatuses may come from different manufacturers. At the same time, the designers of new apparatuses for use in such a system will be constrained as little as possible by the existing features when developing new user dialogue features.

In one embodiment, where the user dialogue session provides specifically for menu control, the user information items include items in a menu for control of the first apparatus, and the identifying means includes means for identifying an association between a user control signal and a specific one of said menu items.

The division of the menu control function in this manner between apparatuses allows the first apparatus to define the information content of the menu (by means of text strings or icons, for example) without regard for the style of menu presentation by the second apparatus (which might even speak the menu information to the user down a telephone line). The manner and style of selection of menu items is also unknown to the first apparatus: items might be selected by number, colour or by a movable pointer on screen. This allows maximum design independence for the manufacturers of both apparatuses.

In an example application, a VCR (first apparatus) may initiate a user dialogue session, using the on-screen display facilities and remote control handset of a TV set (second apparatus). If the user selects to record from a channel which is scrambled (encrypted) the VCR can automatically decide to transfer the user dialogue session to a conditional access sub-system (third apparatus), in order that the user can obtain the necessary entitlement to descramble the signals for recording by the VCR. Of course the invention is not limited to a system of three apparatuses, or to any fixed configuration. The third apparatus may in turn transfer the user dialogue session to a fourth apparatus, and so on. Thus an integrated sequence of user dialogue operations can be provided spanning the functions of several apparatuses, to implement the user's wishes in a user-friendly manner, with each control means deciding freely which apparatus is in the best position to implement the user's wishes at each stage of operation.

The means of the first apparatus may include means for storing data identifying the second apparatus for the duration of the user dialogue session, while the user interface means within the second apparatus includes means for storing data identifying the apparatus with which it currently has a user dialogue session. In a D2B embodiment, for example, the device-subdevice address of the control means may be stored. Each apparatus can in this way limit the number of sessions in which it can become involved, and avoid interference from other apparatuses connected to the bus.

The second apparatus in such an embodiment may act as intermediary between the first and third apparatuses in the transfer of the user dialogue session. This ensures that each apparatus need communicate only with one other in the course of its user dialogue session, no matter how many apparatuses are involved in the process as a whole. Thus small and finite data storage facilities are sufficient for each apparatus, which is important for the designer of mass-market consumer apparatuses.

The further control means within the third apparatus may for example include means for storing data identifying the first and second apparatuses during the continuation of the user dialogue session by the third apparatus. There is thus no need for the second apparatus to remember the identity of more than one other apparatus, at least with regard to the user dialogue function.

At the same time, each of the third and subsequent apparatuses is responsible for remembering the apparatus which transferred the user dialogue session to it, and therefore can further include means for initiating the return of the user dialogue session to that apparatus.

The invention further provides an apparatus having the technical features of the first, second and/or third apparatus of a system according to the invention as set forth above. Further aspects and features of the invention will be apparent from the following description.

BRIEF DESCRIPTION OF THE DRAWINGS

Embodiments of the invention will now be described, by way of example, with reference to the accompanying drawings, in which.

DETAILED DESCRIPTION OF PREFERRED EMBODIMENTS OF THE INVENTION

Figure 1:
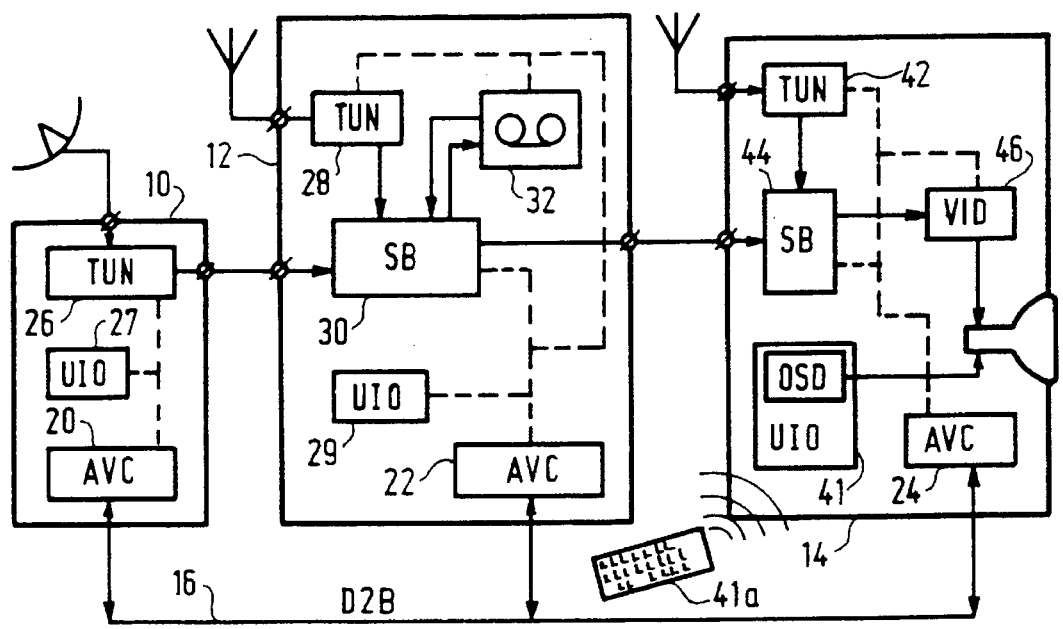
FIG. 1 shows a system constructed in accordance with the invention.

FIG. 1 shows a domestic video entertainment system comprising a satellite broadcast tuner 10, a video cassette recorder (VCR) 12 and a television receiver 14, all connected to a serial data bus 16. Video and audio signals are passed within and between the devices 10,12,14 using, for example, SCART (Euroconnector) plugs, sockets and multiwire cables.

The serial data bus is in this embodiment a Domestic Digital Bus (D2B) as standardised by the International Electrotechnical Commission (IEC), Geneva. D2B provides for distributed control of the bus, and allows commands and other messages to be uniquely addressed for specific "devices", such as the apparatuses 10,12 and 14, and also for specific "subdevices" within each device.

Within each device 10,12,14 there are shown blocks representing D2B subdevices. The division of a device into subdevices is necessary only in a logical sense, that is to say, from the point of view of its behaviour relative to the serial bus 16. In the physical implementation of the device, there may or may not be corresponding separate physical subdevices. In the embodiment shown, each device includes one audio/video controller (AVC) type of subdevice plus others which are logically separate and logically connected to the bus as indicated by the dotted data paths in FIG. 1. The AVC subdevices provide the (distributed) controlling logic of the system as a whole, interpreting user commands and controlling the operation of the system accordingly. In the physical implementation of the device, the control logic of the AVC and some or all of the other subdevices will often be integrated using a single programmed microcontroller. Other subdevices not shown in FIG. 1 will generally be included in such a system, including timers, audio amplifiers, and so forth, and the subdevices described herein are presented as a representative sample only.

In the satellite tuner device 10, a tuner subdevice 26 (TUN) performs the signal processing functions necessary to provide baseband video signals to the connected apparatuses. The AVC subdevice 20 receives user instructions from a user input/output (User I/O) subdevice 27 (UIO) (the front panel and/or remote control of the satellite tuner) and D2B messages from the bus 16, and operates to select channels, keep track of preset channel selections and so forth.

The VCR device 12 includes its AVC subdevice 22, and also a User I/O subdevice 29 (UIO), a terrestrial broadcast tuner subdevice 28 (TUN), a switchbox subdevice 30 (SB) and a videotape record/replay deck 32 (DCK).

The television receiver device 14 includes its AVC subdevice 24 and also a user input/output subdevice 41 (UIO), a terrestrial tuner subdevice 42 (TUN), a switchbox subdevice 44 (SB) and a video monitor subdevice 46 (VID). The User I/O subdevice 41 of the television receiver includes an on-screen display (OSD) function, as described hereinafter, and a remote control 41a for the receipt of user control signals.

In operation, the tuner subdevices 26,28 and 42 can be regarded as sources of video signals with in the system. The video monitor subdevice 46 can act as a destination for video signals, and functions to display images to the user. The record/replay deck subdevice 32 can act as a source and/or a destination of video signals, depending whether it is playing and/or recording at a given time.

Since the functional elements within the apparatuses 10,12,14 are addressable as D2B subdevices, any of the AVC subdevices 20,22,24 can take control of the bus and address commands to those subdevices. This is done for example by an AVC subdevice which has been informed of a user command by a User I/O subdevice and requires control of subdevices at various points in the system to implement the user's wishes.

D2B message formats for controlling the basic functions of certain common subdevices are defined already in the IEC standard referred to above, while scope is left for defining not only new commands, but also request and reply messages that enable one D2B device or subdevice to interrogate another as to its properties and status. Each switchbox subdevice 30 and 44 can be controlled via the bus (or by its associated AVC subdevice) to connect its output data paths(s) a specified one of its input data paths. For example, if a user indicates to the television receiver device 14 that it is desired to watch a certain satellite broadcast channel, suitably addressed and coded D2B messages can be sent via the bus 16 to ensure that the satellite tuner 10, VCR 12 and the television 14 are active, to cause the satellite tuner 10 to select the appropriate channel, to cause the VCR switchbox subdevice 30 and the television switchbox subdevice 44 to connect the appropriate signal path from source to destination. There are many ways of arranging these events with or without user intervention. For greatest user-friendliness, the whole process can be controlled by the AVC subdevice of the device which receives the user input. The information necessary for building the signal path from source to destination can be obtained by a suitable series of D2B request messages to the relevant devices and subdevices. A suitable system for providing such control is described in co-pending and co-owned U.S. patent application Ser. No. 07/717,171 which has issued as U.S. Pat. No. 5,463,619. In that system no AVC subdevice requires knowledge of the complete system, only its nearest neighbors.

In order to provide a user-friendly user interface for the system, any AVC subdevice (hereinafter "AVC") may wish to display user messages using the on-screen display (OSD) facility of the User I/O subdevice 41. For example, when the television is activated by a user and a signal path set up according to the user's wishes, the AVC 24 may wish to confirm visually for the user which channel is being watched. If the signal comes from the satellite tuner 10, a conventional on-screen display would be able to confirm no more than the fact that the signal is coming from an external connector of the television 14. To allow the displayed information to include the actual channel name, known only within AVC 20, a device information process is set up, with the AVC 24 acting as the initiating AVC and AVC 20 acting as an addressed AVC. This process is described in detail in copending European patent application co-pending and co-owned U.S. patent application Ser. No. 07/853,368, now abandoned.

The device information process provides only a one-way flow of information, however. A user-friendly operation could be enhanced by the ability for the VCR 12 and satellite tuner 10 to display menus for the user using the OSD function of the User I/O subdevice 41 of the television 14, and to receive the user's menu selections back from the User I/O subdevice to control further operation. To this end, menu control functions are now defined in the AVC subdevices 20 and 22, and in the User I/O subdevice 41 of the television. The menu control functions are standardized for reliable operation, but allowing as much freedom as possible for the manufacturers of the different apparatuses to provide their own style of implementation. For example, the television manufacturer might develop a particular visual style of menu, with use of special text fonts and color-coding of menu entries, for example, while the VCR manufacturer might develop a particularly efficient and intuitively operable menu tree structure. Both of these elements can be combined by appropriate partitioning of responsibilities between subdevices in the menu control function, as described below.

Figure 2:
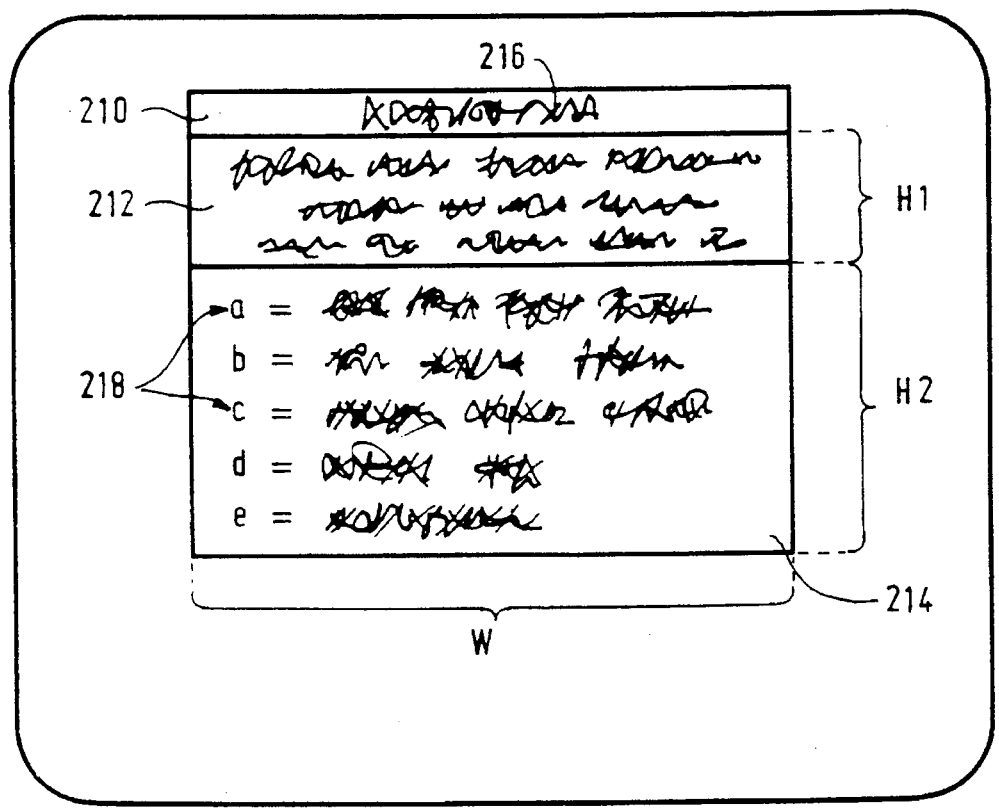
FIGS. 2 to 3 illustrate the operation of a menu control function in the system of FIG. 1.

FIG. 2 shows a standardized menu window layout, of the type that can be generated in the embodiment described. The menu window 200 is divided into a header filed 210, an information field 212 and a selection field 214. The header field has room for a single line of text 216, of a length W characters, which text is defined by a string of W character codes in accordance with a standard character set. The information field contains room for a number H1 of lines of W text characters, and can be used by the AVC to give instructions to the user.

The selection field 214 has room for a number H2 of items for user selection. The AVC provides a text string of W-4 characters to identify the item to the user. The leftmost four characters are available for the User I/O subdevice to show selection key information 218 for each item. Thus in the embodiment described, there might be buttons marked 'a', 'b', 'c', 'd' and 'e' on the remote control handset 41a of the television 14, and the User I/O subdevice 41 recognises these buttons as selectors of the five displayed menu items. Alternative embodiments might use other symbols, or colour coding as the selection key information.

For the purposes of menu control functions, the present embodiment distinguishes between the functions of an AVC subdevice and a User I/O subdevice, and defines the means of cooperation between the two subdevices.

With regard to menu control the AVC subdevice has three states: Inactive, Active and Exchanged. In the Inactive state, the AVC is currently not engaged in a menu control session. In the Active state, the AVC is currently engaged in a menu control session on a certain User I/O subdevice or it is trying to establish a menu control session with a User I/O subdevice. In the Exchanged state the AVC is engaged in a menu control session, but one of the generated menus has given the user the ability to transfer menu control to another device, and the right of menu control has transferred to the AVC subdevice of that device.

Since it is assumed that an AVC can have only one menu control session active at one time, each AVC is only able to start a menu control session if it is in the Inactive state. In the other states the AVC will not start a menu control session when requested by a local event or a [menu] [on] command, described below.

As far as menu control is concerned, an AVC maintains the following data items:

State—Inactive, Active, or Exchanged

Initiating AVC—Device-subdevice address of the AVC subdevice that initiated the menu control session, if applicable. This could be the AVC itself in case of e.g. a local event.

Transferred AVC—Device-subdevice address of the AVC subdevice to which menu control has been transferred, if applicable.

User I/O—Device-subdevice address of the User I/O subdevice on which the menu control session is running.

With regard to menu control the User I/O subdevice has three states, Off, On and Transferring. In the Off state, no menu is displayed. In the On state, one menu is currently displayed or is about to be displayed. In the Transferring state, the User I/O subdevice is transferring menu control from one AVC to another AVC. Since it is assumed that an User I/O subdevice can display only one menu at a time, it can only start a menu control session if it is in the Off state. If the User I/O subdevice has its menu control function in the On state, then it will not start another menu control session.

As far as menu control is concerned, an User I/O subdevice maintains the following data:

Current state—On, Off or Transferring.

Current AVC—Device-subdevice address of the AVC which currently has a menu control session (that is it may define a menu) with the User I/O subdevice, and to which user commands regarding menu control will be sent.

Window specification—The User I/O subdevice knows whether a window specification has been received or not. For the details of the window specification see the description of the command [define menu window] below.

Menu items—The User I/O knows all menu items which have been defined and their current status as far as user input/control is concerned. For details of the data for each item see the description of the commands [define menu item] and [user entry] below.

The command messages defined to allow implementation of the menu control function via D2B will now be described, to be followed by a brief illustration of their use in practical operation.

A Menu Control command [menu control][state] is defined for use by a User I/O subdevice to exchange the right of menu control from one AVC to another AVC. Three different [state] parameters are defined: [given], which includes the device-subdevice address of an initiating AVC; [finished], which includes the address of a current AVC; and [aborted], which includes the address of a current AVC.

If the [menu control] [given] command is received by an AVC which is in the Inactive state, then the addressed AVC goes to the Active state, stores the device-subdevice address specified in the command as the initiating AVC, stores the device-subdevice address of the User I/O subdevice which sent this command as the current User I/O, and starts menu control on that User I/O subdevice. When menu control is finished (for example the AVC/user decides to stop menu control), the addressed AVC returns menu control to the initiating AVC via the current User I/O subdevice with a [menu session] [finished] command, described below.

If the [menu control] [given] command is received by an AVC which is in the Active state or in the Exchanged state, then the addressed AVC does not start a second menu control session but returns the right of menu control to the specified initiating AVC via the current User I/O subdevice with a [menu session] [aborted] command, described below.

If the [menu control] [finished] command is received while the AVC is in the Exchanged state, then the addressed AVC goes to the Active state, stores the device-subdevice address of the User I/O subdevice that sent this command as the current User I/O and resumes menu control on that User I/O subdevice. The specified current AVC is the AVC which finished its menu control and returned the right of menu control to the AVC which received this command.

If the [menu control] [aborted] command is received while the AVC is in the Exchanged state, then the addressed AVC goes to the Active state, stores the device-subdevice address of the User I/O subdevice that sent this command as the current User I/O and resumes menu control on that User I/O subdevice. The specified current AVC indicates the AVC which was asked to start menu control but was not able to do so and therefore aborted.

A Menu Session command [menu session] [parameter] is defined for use by an AVC to start or stop a menu control session with the OSD function of a User I/O subdevice or to transfer a menu control session to another AVC. The parameter field can take the value [off], [on], [transfer], [finished] or [aborted]. The value [transfer] includes the address of a new AVC. Values [finished] and [aborted] include the address of an initiating AVC.

If the [menu session] [off] command is received while the menu control function of the User I/O subdevice is in the On state and the device-subdevice address of the AVC which sent this command is the same as that stored as the current AVC, then the menu control function goes to the Off state.

If the [menu session] [on] command is received while the menu control function of the User I/O subdevice is in the Off state, then the menu control function goes to the On state and the device-subdevice address of the AVC which sent this command is stored as the current AVC. The User I/O subdevice also memorises that a window specification has not yet been received and it is received while the menu control function of the User I/O subdevice is in the On state or Transferring state, then the User I/O subdevice disregards this command, since it can store data for only one session at a time.

If the [menu session] [transfer] command is received from the current AVC while the menu control function of the User I/O subdevice is in the On state, then the User I/O subdevice goes to the Transferring state where it transfers menu control from the current AVC to the new AVC subdevice specified in the command, by issuing a command [menu control] [given] to the new AVC. If this command is transmitted successfully, the menu control function of the User I/O subdevice goes to the On state and replaces the device-subdevice address stored as the current AVC with the address of the new AVC. If the command transmission was not successful, the User I/O subdevice issues a command [menu control] [aborted] to the current AVC and goes to the On state. It also memorises in either case that a window specification has not yet been received and clears its list of menu items.

If the [menu session] [finished] command is received from the current AVC while the menu control function of the User I/O subdevice is in the On state, then the User I/O subdevice goes to the Transferring state where it transfers menu control from the current AVC to the specified initiating AVC. The User I/O subdevice issues a command [menu control] [finished] to the specified initiating AVC. If this command is transmitted successfully, the menu control function of the User I/O subdevice goes to the On state, and replaces the device-subdevice address stored as the current AVC with the address of the specified initiating AVC. It also memorises that a window specification has not yet been received and it clears the list of menu items. If the command transmission was not successful, the User I/O menu control function goes to the Off state.

If the [menu session] [aborted] command is received from the current AVC while the menu control function of the User I/O subdevice is in the On state, then the User I/O subdevice goes to the Transferring state where it returns menu control from the current AVC to the specified initiating AVC. The User I/O subdevice issues a command [menu control] [aborted] to the specified initiating AVC. If this command is transmitted successfully, the menu control function of the User I/O subdevice goes to the On state, and replaces the device-subdevice address stored as the current AVC with the address of the specified initiating AVC, It also memorises that a window specification has not yet been received and clears the list of menu items. If the command transmission was not successful, the menu control function of the User I/O subdevice goes to the Off state.

A Menu Entry command [menu entry] [operand] is defined for use by a User I/O subdevice to inform an AVC subdevice that the user has entered a command to start, stop or restart menu control. The operand can take the value [off],[on],[repeat] or [previous].

When the user indicates a desire to start menu control, the menu control function of the User I/O subdevice will send the command [menu entry] [on] to the AVC subdevice stored. When the user has requested return to a previous menu, then the menu control function will send the command [menu entry] [previous] to the AVC subdevice. If the current menu of the menu control session has been garbled, corrupted or overwritten by the User I/O subdevice and the menu has to be re-displayed, then the last displayed menu can be asked for by sending a [menu entry] [repeat] command to the current AVC subdevice. When the user indicates a desire to end menu control while the menu control function of the User I/O subdevice is in the On state, then the menu control function will send the command [menu entry] [off] to the AVC subdevice stored as the current AVC.

If an AVC subdevice receives the command [menu entry] [off] while it is in the Active or Exchanged state, and the AVC device-subdevice address stored as initiating AVC is equal to its own device-subdevice address, then the AVC subdevice will send a command [menu session] [off] to the User I/O subdevice stored and then the menu control function goes to the Inactive state (i.e. the AVC subdevice stops the generation of menus). If an AVC subdevice receives the command [menu entry] [off] while it is in the Active or Exchanged state, and the AVC device-subdevice address stored as initiating AVC is not equal to its own device-subdevice address, then the AVC subdevice will send a D2B command [menu session] [finished] to the User I/O subdevice stored and then the menu control function goes to the Inactive state (i.e. the AVC subdevice stops the generation of menus).

If the AVC subdevice receives the command [menu entry] [on] while it is in the Inactive state, then the menu control function goes to the Active state, stores the device-subdevice address of the User I/O subdevice which sent this command, starts a menu control session with the menu control function of that User I/O subdevice and starts menu control at its main menu.

If an AVC subdevice receives the command [menu entry] [previous] while it is in the Active state, then the following applies. If the menu control feature is not in the main menu, then it goes to the previous menu (e.g. it goes up one step in the menu tree). If the menu control feature is in the main menu, and the AVC device-subdevice address stored as initiating AVC is different from its own device-subdevice address (i.e. the menu control feature has been started by an external AVC subdevice via an User I/O subdevice with a [menu control] [given] command), then the AVC subdevice sends a [menu session] [finished] command to the current User I/O subdevice and then goes to the Inactive state. Otherwise it stops the menu control session on the User I/O subdevice stored with a [menu session] [off] command.

If an AVC subdevice receives the command [menu entry] [repeat] while it is in the Inactive state, then the menu control function goes to the Active state, stores the device-subdevice address of the User I/O subdevice which sent this command, starts a menu control session with the menu control function of the User I/O subdevice and restarts menu control at its current menu (i.e. the menu last sent). If an AVC subdevice receives the command [menu entry] [repeat] while it is in the Active state, then the menu control function redefines its current menu (i.e. the menu last sent) to the menu control function of the User I/O subdevice stored.

A Define Menu Window command [define menu window] [window specification] is defined for use by an AVC to propose a menu that may fit in the menu window provided by the menu control function of the User I/O subdevice. The parameter [window specification] contains information defining the proposed menu format, including:

whether the menu is a main menu or a normal menu, that is whether it is possible to go higher in the 'menu tree' by means of a command [menu entry] [previous];

the width W in characters of the menu header and menu information fields 210 and 212;

the number of lines in the information field 212;

the width in characters of each item, allowing space for the key information 218, to be defined by the User I/O subdevice; and a list of item types, including as many item types as there are to be items in the menu.

Several different item types may be defined in addition to the simple selectable items illustrated in FIG. Z. For example 'slider' controls for volume, brightness levels etc. can be provided, and items which allow entry of numeric items such as radio frequencies and personal identification codes. When a User I/O subdevice receives this command, it verifies if it is in the On state and if the device-subdevice address of the stored AVC is equal to the device-subdevice address of the AVC which sent this command, and if the required menu specification can be displayed in the menu window supported.

A Display Menu Header command [display menu header] [text string] is defined for use by an AVC (the AVC which is known to the User I/O as having the right of menu control) to send text for the menu header field 210 to the User I/O subdevice. Similarly, a Display Menu Text command [display menu text] [text string] is defined for uses by the AVC to send text for the information field 212.

A Display Menu Item command [display menu item] [item number] [item specification] is defined for the current AVC to send a text field and other parameters of the item to the User I/O subdevice. Where different types of menu item are possible, the field [item specification] should reflect correctly the item type of the item identified by the field [item number], as defined in the list of item types in the previously supplied window specification. The field [item specification] also specifies for example when and how feedback is to be supplied to the AVC in response to user actions by means of the command [user entry] described elsewhere.

A User Entry command [user entry] [item number] [select state] is defined, for use by a User I/O subdevice to return a user entry to the stored AVC. Each [user entry] command defines the updated state (for example: selected or de-selected) of the menu item identified by the [item number] operand. As far as the User I/O subdevice is concerned, several items can be in the selected state at one time. Other operands are defined for the other item types such as sliders and numeric entry items.

Also defined are request messages [menu control?], [menu session?] and [menu window?]. Request [menu control?] can be addressed to an AVC to find out the state of its menu control function: Active, Inactive or Exchanged. A reply [Active] will also specify the initiating AVC (which can be the addressed AVC itself) and the current User I/O as known to the addressed AVC. A reply [Exchanged] will also specify the initiating AVC and the transferred AVC. Request [menu session?] performs a similar function when addressed to a User I/O subdevice, which will reply [On],[Off] or [Transferring]. The reply [On] will specify the current AVC, while the reply [Transferring] specifies both the current AVC and the new AVC. The request [menu window?] is used by an AVC which has sent a window specification (see Define Menu Window command) to find out if the User I/O subdevice can display the specified menu. If the reply is that the User I/O subdevice cannot display the specified menu, the reply contains a specification of a window that is possible, in terms of width, number of items and so forth.

Figure 3:
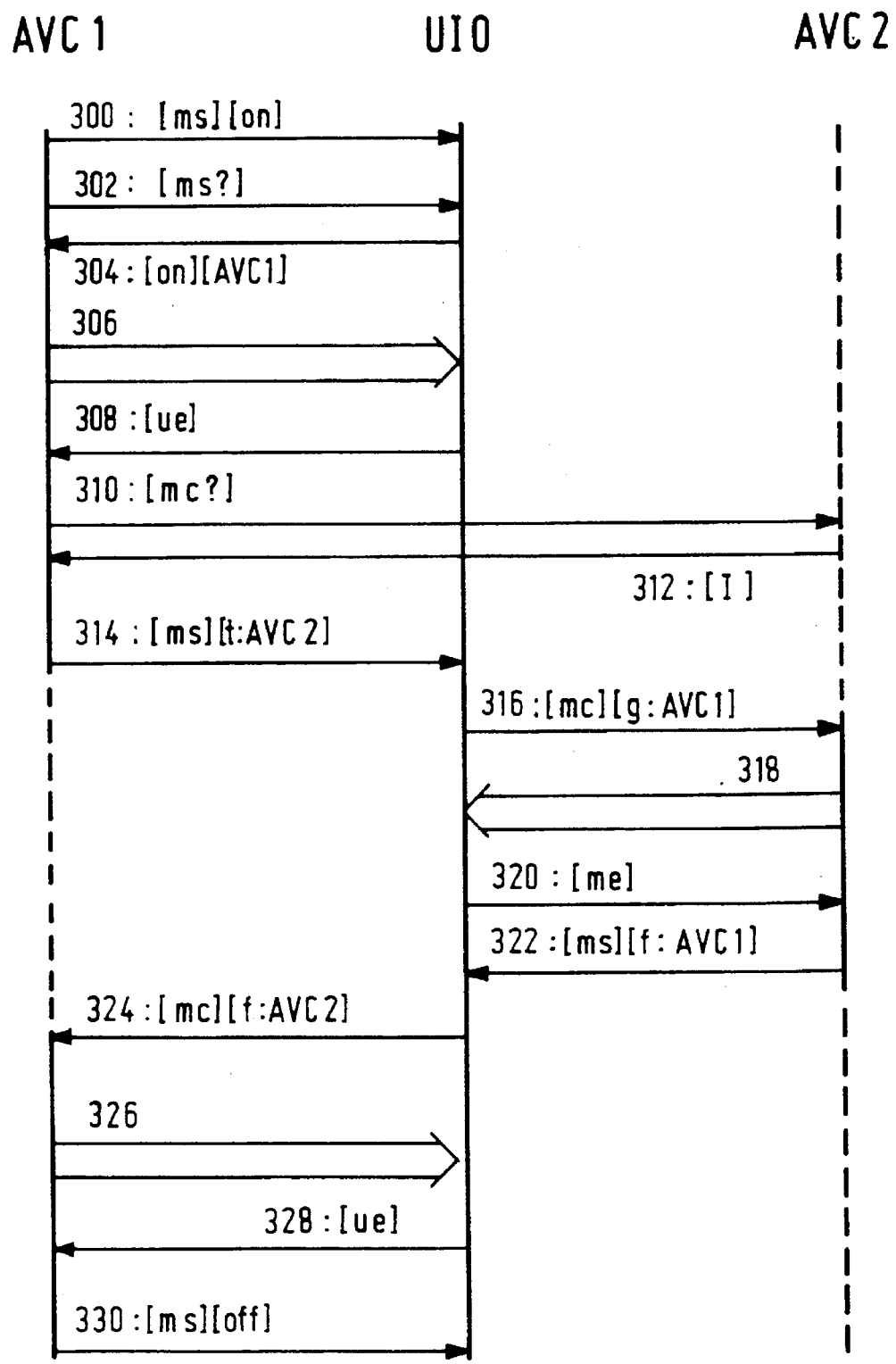

The operation of the menu control functions of the system of FIG. 1 will now be illustrated by the examples of FIGS. 2 and 3.

In the operation of the menu control functions of the system there are basically three alternative events which can give rise to the start of a menu control session:

an AVC starts menu control due to a local event (for example end of tape, user presses a key on the local keyboard, or the need for authorization in case of conditional access);

the user wants to start menu control via a User I/O subdevice (for example he/she presses a 'start menu control' button on the remote control hand set) and an AVC which shows a menu, has as one of the options to transfer menu control to another device (for example one of the menus of the television allows menu control to be transferred to the VCR).

When, due to a local event such as end of tape in the VCR 12, the AVC 22 (for example) wants to start menu control, it simply starts a session with the menu control function of the User I/O subdevice 41, by sending a [menu session] [on] command. The AVC then defines the menu window and items therein, and receives the user's menu selections from the User I/O subdevice. When the menu control has finished, the AVC 22 releases the menu control session in the User I/O subdevice 41 with a [menu session] [off] command. This might happen due to the user ending menu control (which is then indicated to the AVC with a [menu entry] [off] command) or due to a local event (for example no user response on the current menu for a certain period of time, or the user puts the device in standby using local keys).

It may be in the course of menu control operations that one of the items selected on the menu generated by the AVC 22 of the VCR 12 relates for example to the recording of a programme from the satellite tune 10. This may involve channel selection in the satellite tuner, and also operations for obtaining conditional access authorisation (pay-as-you-view television). Clearly, for a consistent menu-based user interaction, it is desirable that such operations can be performed by the user with a view of the system as an integrated whole, without concern as to whether this menu or that affects one apparatus or another (or all of them). At the same time, it is impracticable to expect the AVC 22 (for example) to know the menus and actions required to control all apparatuses in the system, particularly in view of the fact that these apparatuses can be added to the system at any time, and may come from different manufacturers.

FIG. 3 illustrates how the facility to transfer menu control from one AVC to another and back again can be used to provide an integrated menu control function for a group of apparatuses in such circumstances. Time is represented vertically down the drawing, with actions of a User I/O subdevice (41, for example) represented in a central column, and action of a first AVC (for example AVC 22 of the VCR 12) and a second AVC (for example AVC 20) represented to the left and right respectively. The device-subdevice addresses of these subdevices are represented as UI0, AVC1 and AVC2 respectively. Arrows represent bus requests and commands, whose names are abbreviated in the drawing, for reasons of space. A solid vertical line indicates menu control state Active or On in the corresponding subdevice.

At the start o#the sequence of FIG. 3, the first AVC (AVC1) has Inactive for its menu control state. At 300, command [menu session] [on] is addressed to the User I/O subdevice, and at 302 a request [menu session?] is sent to the User I/O subdevice. The reply to this request at 304 indicates that a menu control session has been stated successfully between subdevices UI0 and AVC1. The subdevice AVC1 proceeds at 306 supply a menu window specification, define menu header text, information text and item texts using the commands described above. The subdevice UIO then displays these on the television screen and begins to supply [user entry] commands in response to the user's selection of items from the displayed menu.

In the course of these operations, an item is selected which requires transfer of menu control to subdevice AVC2. The subdevice AVC1 responds to the corresponding [user entry] command by addressing a [menu control?] request to the second AVC subdevice AVC2. Subdevice AVC2 replies at 312 that its menu control state is Inactive. The first AVC sends command [menu session] [transfer AVC2] to the subdevice UIO at 314, and enters the Exchanged state. The User I/O subdevice UIO at 316 uses command [menu control] [given: AVC1] to inform the second AVC that the transfer is desired.

Assuming a successful transfer, the second AVC enters the Active state and at 318 initiates menu display and control with the User I/O subdevice. At 320, the subdevice UIO informs the second AVC that the user (having finished or aborted menu control of the corresponding apparatus) has requested a return to the previous menu. Since the previous menu was generated by an 'initiating AVC' which is not the second AVC itself, the second AVC concludes its menu control operations at 322 with a command [menu session] [finished: AVC1] to the subdevice UIO, entering the Inactive state.

At 324 the subdevice UIO uses command [menu control] [finished: AVC2] to inform the first AVC that menu control responsibility is returned to it. The first AVC then resumes its menu display at 326 and at 328 receives a [user entry] command which indicates the end of menu control operations. The first AVC therefore terminates the menu session with subdevice UI0 by sending [menu session] [off] at 330.

Of course an infinite range of eventualities are possible in a real system, which can be handled in a consistent manner thanks to the predefined meaning of the bus commands and requests defined above. Menu control can be transferred repeatedly down a chain of three or more AVCs, yet with control always being returned correctly to the initiating AVC. At the same time, each subdevice need only maintain a finite and predefined set of data within appropriate to its current state, enabling a low-cost implementation. Adding the facility to store a second set of such data would allow an AVC to take part in two menu control sessions, so that for example the 'chain' of AVCs just mentioned would be able to 'double back' to the same AVC.

From reading the present disclosure, other modifications will be apparent to persons skilled in the art. Such modifications may involve other features which are already known in the design, manufacture and use of local communication systems, domestic audio/video apparatuses and component parts thereof and which may be used instead of or in addition to features already described herein. For example, there are possible forms of user dialogue other than menu control. Also there are many possible forms of serial data channel other than D2B. The data channels may, for example, be provided via copper wire, optical fibre or wireless links.

Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A local communication system comprising first, second and third apparatuses coupled to a serial data channel for the exchange of messages therebetween, wherein said first apparatus comprises first control means and said second apparatus comprises user interface means, and wherein said first control means comprises:
   a) first initiating means for initiating a user dialogue session with said second apparatus;
   b) first sending means for sending to said second apparatus a user information item for presentation to a user of the system during said user dialogue session;
   c) first receiving means for receiving from said second apparatus, information which conveys user control signals responsive to said user information item during said user dialogue session;
   d) second control means for controlling at least part of the system in accordance with said information; and
   e) second initiating means for initiating a transfer of control of said session to said third apparatus during said user dialogue session, and wherein said user interface means comprises:
   f) second receiving means for receiving from said first apparatus said user information item and for presenting said user information item to said user;
   g) third receiving means for receiving a control signal from said user during the user dialogue session;
   h) identifying means for identifying an association between said control signal and said user information item; and
   i) second sending means for sending to said first apparatus, information which conveys said control signal by reference to said user information item; and and wherein said third apparatus comprises:
   j) fourth receiving means for receiving said transfer of control of said user dialogue session from said second initiating means; and
   k) further control means for continuing said user dialogue session without active participation by said first control means.

2. The system as claimed in claim 1, wherein said user information item is a menu item.

3. The system as claimed in claim 1, wherein said first initiating means comprises means for storing data identifying said second apparatus, and wherein said second apparatus comprises means for storing data identifying said first apparatus.

4. The system as claimed in claim 1, wherein said third apparatus comprises means for storing data identifying said first and second apparatuses.

5. The system as claimed in claim 1, wherein said third apparatus includes means for initiating a return of the user dialogue session to said first apparatus.

6. A first apparatus comprising a control means and an interface to a serial data channel for exchanging messages to second and third apparatuses over said serial data channel, said first apparatus comprising:

means for initiating a user dialogue session with said second apparatus;

means for sending to said second apparatus at least one user information item during said user dialogue session;

means for receiving from the second apparatus information during said user dialogue session which conveys user control signals by reference to said at least one said user information item; and means for controlling said first apparatus in accordance with said information;

wherein said control means comprises:
      means for initiating during said user dialogue session, a transfer of control of said session from said first apparatus to said third apparatus when said information conveys a predetermined one of said user control signals.

7. The first apparatus as claimed in claim 6, further including means for storing data identifying said second apparatus for the duration of said user dialogue session.

* * * * *